US008571549B2

(12) United States Patent
Peterson et al.

(10) Patent No.: US 8,571,549 B2
(45) Date of Patent: Oct. 29, 2013

(54) ACCESS CONTROL FOR ROAMING RADIO DEVICES

(75) Inventors: Larry M. Peterson, West Chicago, IL (US); Daniel J. McDonald, Cary, IL (US); Brian R. Poe, Cary, IL (US); John W. Maher, Woodstock, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 0 days.

(21) Appl. No.: 13/296,375

(22) Filed: Nov. 15, 2011

(65) Prior Publication Data

US 2013/0122900 A1 May 16, 2013

(51) Int. Cl.
*H04W 4/00* (2009.01)
(52) U.S. Cl.
USPC ............... 455/432.3; 455/342.1; 455/452.1
(58) Field of Classification Search
USPC ........... 455/432.1, 432.3, 433, 435.1, 435.2, 455/435.3, 518–521
See application file for complete search history.

(56) References Cited

U.S. PATENT DOCUMENTS

| | | | |
|---|---|---|---|
| 6,311,055 B1 | 10/2001 | Boltz | |
| 7,187,928 B1 * | 3/2007 | Senn et al. | 455/432.1 |
| 7,263,353 B2 | 8/2007 | Forsberg et al. | |
| 7,321,768 B2 | 1/2008 | Armbruster et al. | |
| 7,869,819 B2 * | 1/2011 | Noldus | 455/461 |
| 8,326,283 B1 * | 12/2012 | Hursey et al. | 455/432.1 |
| 2003/0092441 A1 | 5/2003 | Taha et al. | |
| 2004/0132449 A1 * | 7/2004 | Kowarsch | 455/432.1 |
| 2006/0072517 A1 * | 4/2006 | Barrow et al. | 370/335 |
| 2007/0298788 A1 * | 12/2007 | Corson et al. | 455/433 |
| 2011/0195710 A1 * | 8/2011 | Nas et al. | 455/432.3 |

FOREIGN PATENT DOCUMENTS

| | | |
|---|---|---|
| EP | 1665855 B1 | 7/2007 |
| WO | 2007130969 A2 | 11/2007 |

OTHER PUBLICATIONS

Project 25; Revision A of TIA-102.BACA, Aug. 2006, "ISSI Messages and Procedures for Voice Service" (Version 2); May 9, 2008; Section 2.1.3.1 Mobility Management; pp. 38-42.
PCT International Search Report Dated January 25, 2013 for Counterpart Application PCT/US2012/061626.

* cited by examiner

*Primary Examiner* — San Htun
*Assistant Examiner* — Magdi Elhag
(74) *Attorney, Agent, or Firm* — Daniel R. Bestor

(57) ABSTRACT

Methods and systems are provided for supporting roaming wireless devices and roaming wireless groups with access controls. One exemplary method involves obtaining a set of permissions associated with a roaming device from its home radio system, obtaining a set of permissions for the roaming device from the visited radio system, merging the obtained sets of permissions, and responding to a request from the roaming device in accordance with the merged set of permissions for the roaming device within the visited radio system. Another exemplary method involves obtaining permissions associated with a roaming radio group from its home radio system, obtaining permissions for the roaming radio group from the visited radio system, merging the obtained permissions, and responding to a group service request for the roaming radio group in accordance with the merged set of permissions for the roaming radio group within the visited radio system.

20 Claims, 2 Drawing Sheets

ACCESS CONTROL FOR ROAMING RADIO DEVICES

TECHNICAL FIELD

Embodiments of the subject matter described herein relate generally to communications systems, and more particularly, embodiments of the subject matter relate to access controls for roaming radio devices within a visited radio system.

BACKGROUND

Mobile radio systems are widely utilized to communicate information within an organization. For example, police departments, fire departments, or other public safety organizations often deploy a private mobile radio system that covers the organization's geographic region or jurisdiction and supports communications among members of the organization.

In some situations, it is desirable to allow members of one organization to communicate on another organization's radio system. For example, in the event of an emergency within one jurisdiction, public safety personnel from neighboring jurisdictions may operate within that jurisdiction where the emergency exists, and it may be desirable to allow the public safety personnel from the various jurisdictions to communicate on the visited jurisdiction's radio system. Accordingly, standards, such as Project 25, have been developed to support interoperability among different radio systems and their associated radios. However, the administrator of the visited radio system may desire additional control over the system's resources and/or the capabilities of the roaming radios.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. Furthermore, there is no intention to be bound by any expressed or implied theory presented in the preceding technical field, background, brief summary or the following detailed description.

Embodiments of the subject matter described herein generally relate to controlling the permissions, rights, and/or privileges afforded to roaming radio devices within a visited radio system. As described in greater detail below, the administrator of the visited radio system may define a set of permissions for roaming radio devices within its coverage area. In this regard, as used herein, a set of permissions for a radio device should be understood as referring to the criteria and/or values associated with various categories of rights, privileges, operating capabilities, or other attributes that define or otherwise delimit the operation of that radio device within a radio system, such as, for example, service levels and/or capabilities (e.g., individual calling capabilities, group calling capabilities, data capabilities), priority levels, areas and/or regions the radio device may operate within, and the like. When a roaming radio device attempts to register with or otherwise requests services from the visited radio system, the visited radio system obtains permissions for that radio device from its home radio system. In exemplary embodiments, the visited radio system combines, merges, or otherwise modifies those obtained permissions with specific permissions assigned to that radio device or default permissions for devices from that roaming radio device's home radio system that are defined within the visited radio system to obtain a merged set of permissions for the roaming radio device. The merged set of permissions is then used when responding to requests from the roaming device and governs operation of the roaming radio device within the visited radio system. As described in greater detail below, the merged set of permissions are influenced by the permissions defined and/or maintained by the visited radio system, such that the administrator or operator of the visited radio system can dictate the operation of the roaming radio device within the visited radio system and better control the allocation of system resources among roaming radio devices.

Figure 1:
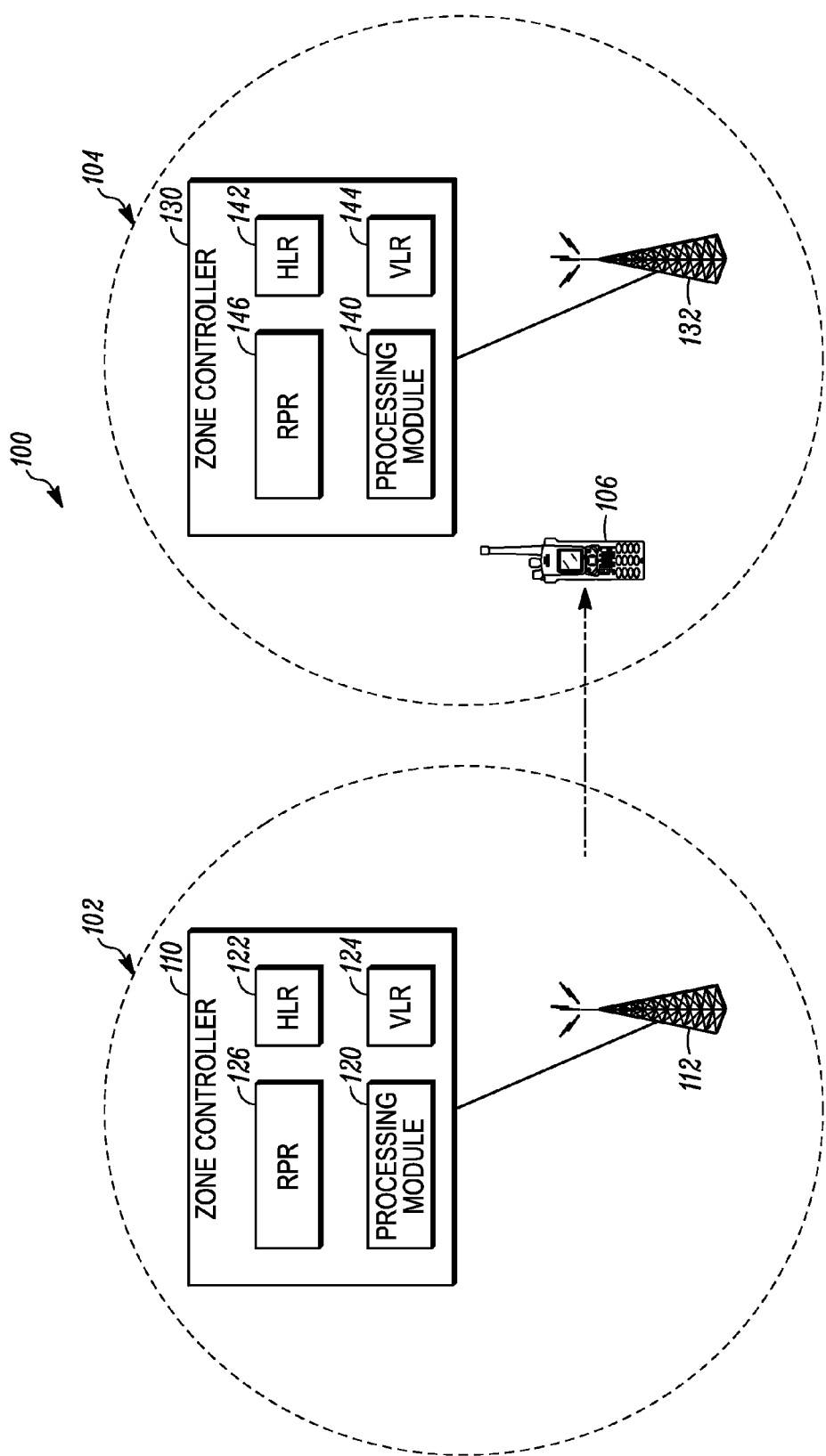
FIG. 1 is a block diagram of an exemplary embodiment of a communications system.

Turning now to FIG. 1, in an exemplary embodiment, a communications system 100 includes a first radio system 102, a second radio system 104, and a mobile radio device 106. The mobile radio wireless device 106 may be realized as a handheld radio or any other mobile communications device capable of communicating with the radio systems 102, 104. In the illustrated embodiment of FIG. 1, the mobile radio wireless device 106 is associated with the first radio system 102 and is roaming within the geographic coverage area of the second radio system 104, as described in greater detail below. In other words, the first radio system 102 is the home radio system for the mobile radio wireless device 106 while the second radio system 104 is a visited radio system for the mobile radio wireless device 106. Accordingly, for convenience, but without limitation, the first radio system 102 may alternatively be referred to herein as the home radio system, the second radio system 104 may alternatively be referred to herein as the visited radio system, and the mobile radio wireless device 106 may alternatively be referred to herein as the roaming device.

In exemplary embodiments, the radio systems 102, 104 are each realized as a wide area trunked radio system, wherein the radio systems 102, 104 each cover a different geographic area. In this regard, although FIG. 1 depicts the geographic coverage areas of the radio systems 102, 104 as being distinct, in practice, the coverage area of one of the radio systems 102, 104 may overlap a portion of the coverage area of the other radio system 102, 104. In accordance with one or more embodiments, the radio systems 102, 104 are controlled, owned, or otherwise operated by different entities and/or organizations. For example, the home radio system 102 may be operated by a public safety organization responsible for a first jurisdiction (e.g., a city, county, state, or other geographic area) and the visited radio system 104 may be operated by a public safety organization responsible for a neighboring jurisdiction. In an exemplary embodiment, the radio systems 102, 104 are interoperable and support an intersystem interface that facilitates communications between infrastructure components of one radio system 102, 104 (e.g., zone controllers, sites, or the like) with those of the other radio system 102, 104. For example, in accordance with one embodiment, each of the radio systems 102, 104 is compliant with the Project 25 standards to establish an Inter RF Subsystem Interface (ISSI) between the infrastructure components of the radio systems 102, 104.

Still referring to FIG. 1, in an exemplary embodiment, the home radio system 102 includes at least one zone controller 110 and at least one site 112. The zone controller 110 generally represents a server or another computing device that is communicatively coupled to the site 112 (e.g., via a direct physical interface, a wireless interface, a computer network or another communications network) and provides centralized control and/or management of one or more zones within the home radio system 102, as described in greater detail below. In this regard, the zone managed or otherwise controlled by the zone controller 110 should be understood as referring to the portion of the geographic coverage area of the home radio system 102 that corresponds to the geographic coverage area of the one or more sites 112 associated with the zone controller 110. The site 112 generally represents the transceivers, amplifiers, antennas, controllers, and/or other hardware configured to transmit and/or receive radio frequency signals and convert received radio frequency signals to and/or from baseband signals for transmission to and/or from the zone controller 110, as will be appreciated in the art.

In an exemplary embodiment, the zone controller 110 includes, without limitation, a processing module 120, a home location register (HLR) 122, a visitor location register (VLR) 124, and a roaming provisioning register (RPR) 126. The processing module 120 generally represents the hardware, software, firmware, processing logic, and/or other components of the zone controller 110 configured to support operation of the home radio system 102 and execute various functions and/or processing tasks described in greater detail below. Depending on the embodiment, the processing module 120 may be implemented or realized with a general purpose processor, a microprocessor, a controller, a microcontroller, a state machine, a content addressable memory, an application specific integrated circuit, a field programmable gate array, any suitable programmable logic device, discrete gate or transistor logic, discrete hardware components, or any combination thereof, designed to perform the functions described herein. Furthermore, the steps of a method or algorithm described in connection with the embodiments disclosed herein, such as those set forth in FIG. 2, may be embodied directly in hardware, in firmware, in a software module executed by processing module 120, as programming instructions stored on a non-transitory short or long term storage media accessed and/or executed by the processing module 120, or in any practical combination thereof.

In an exemplary embodiment, the HLR 122 stores or otherwise maintains sets of permissions, with each set of permissions being associated with a respective radio device of the home radio system 102 that is associated with the zone managed by the zone controller 110. For example, the roaming device 106 may be associated with the zone managed by the zone controller 110, wherein the HLR 122 includes a set of permissions corresponding to the permissions, rights, privileges, and/or operating capabilities of the roaming device 106 within the home radio system 102 and/or the zone managed by the zone controller 110. In this regard, the set of permissions associated with the roaming device 106 includes a plurality of categories corresponding to different permissions, rights, privileges, and/or operating capabilities, wherein for each category, the HLR 122 includes a criterion or value indicative of the level of access and/or operation to be allowed or otherwise provided to the roaming device 106. Additionally, in one or more embodiments, the HLR 122 also maintains sets of permissions associated with one or more radio groups (or call groups or talk groups) that include radio devices associated with the zone managed by the zone controller 110. In this regard, the HLR 122 includes sets of permissions for each of the radio groups which the roaming device 106 is assigned to or has otherwise joined and/or is currently participating in. In practice, the HLR 122 may be realized as a memory or any other non-transitory short or long term storage media, such as, for example, random access memory (RAM), read only memory (ROM), flash memory, registers, hard disks, removable disks, magnetic or optical mass storage, and/or the like.

In an exemplary embodiment, the VLR 124 stores or otherwise maintains sets of permissions or access rights associated with radio devices currently operating within the zone managed by the zone controller 110. For example, when the radio device 106 is within the coverage area provided by the site 112 associated with the zone controller 110, the processing module 120 may obtain the set of permissions corresponding to the roaming device 106 within the home radio system 102 and/or the zone managed by the zone controller 110 from the HLR 122 and store the obtained set of permissions in the VLR 124. Additionally, in accordance with one or more embodiments, the VLR 124 also maintains sets of permissions for radio groups that are associated with radio devices currently operating within the zone managed by the zone controller 110. For example, when the radio device 106 is within the coverage area provided by the site 112 associated with the zone controller 110, the processing module 120 may obtain the set of permissions for the radio groups that the roaming device 106 is associated with from the HLR 122 and store the obtained set of permissions for those radio groups in the VLR 124 As set forth above with respect to the HLR 122, the VLR 124 may be realized as a memory or any other non-transitory short or long term storage media.

In an exemplary embodiment, the RPR 126 stores or otherwise maintains sets of permissions associated with radio devices and/or radio groups that are not associated with the home radio system 102 and/or the zone managed by the zone controller 110. For example, the RPR 126 may include sets of permissions corresponding to the permissions, rights, privileges and/or operating capabilities to be allowed or otherwise provided to radio devices associated with another radio system 104 when those radio devices are roaming within the home radio system 102 and/or the zone managed by the zone controller 110, as described in greater detail below. The RPR 126 may be realized as a memory or any other non-transitory short or long term storage media, as set forth above with respect to the HLR 122.

Still referring to FIG. 1, as set forth above with respect to the home radio system 102, the visited radio system 104 also includes a zone controller 130 and a site 132 communicatively coupled to the zone controller 130. Various elements of the visited radio system 104 are similar to counterpart elements described above in the context of the home radio system 102 and will not be redundantly described in detail with respect to the visited radio system 104.

As illustrated, the zone controller 130 includes a processing module 140, a HLR 142 that stores or otherwise maintains sets of permissions associated with radio devices of the visited radio system 104 that are associated with the zone managed by the zone controller 130, a VLR 144 that stores or otherwise maintains sets of permissions associated with radio devices currently operating within the zone managed by the zone controller 110, and a RPR 146 that stores or otherwise maintains sets of permissions associated with radio devices that are not associated with the visited radio system 104 and/or the zone managed by the zone controller 130. For example, the RPR 146 may store or otherwise maintain a default set of permissions for any radio devices and/or radio groups associated with the home radio system 102 within the visited radio system 104 or a set of permissions for an individual radio device, such as a particular set of permissions associated with the roaming device 106.

As described in greater detail below in the context of FIG. 2, in response to identifying the presence of the roaming device 106 within the visited radio system 104 and/or zone managed by the zone controller 130, the processing module 140 obtains, from the RPR 146, the set of permissions for the roaming device 106 (and/or any radio groups associated with the roaming device 106) within the visited radio system 104 and/or zone managed by the zone controller 130 and also obtains the set of permissions for the roaming device 106 and/or any radio groups associated with the roaming device 106 from the HLR 122 and/or home radio system 102 associated with the roaming device 106. After obtaining the different sets of permissions for the roaming device 106 and/or its associated radio groups from the two different radio systems 102, 104, the processing module 140 determines merged sets of permissions using the sets of permissions for the roaming device 106 obtained from the RPR 146 along with the sets of permissions for the roaming device 106 obtained from the HLR 122. The merged sets of permissions are utilized when responding to requests (e.g., registration requests, individual call requests, group call requests, and the like) from the roaming device 106 for services within the visited radio system 104 and delimit the operating capabilities of the roaming device 106 within the visited radio system 104 and/or zone managed by the zone controller 130. In this manner, an administrator or operator of the visited radio system 104 may dictate or otherwise control operation of the roaming device 106 within the visited radio system 104 by modifying the set of permissions corresponding to the roaming device 106 (and any sets of permissions corresponding to any radio groups associated with the roaming device 106) that are maintained by RPR 146.

It should be understood that FIG. 1 is a simplified representation of the communications system 100 for purposes of explanation, and FIG. 1 is not intended to limit the subject manner in any way. For example, in practice, each radio system 102, 104 may include any number of sites, zone controllers, or the like, which may be suitably configured to support any number of radio devices and/or zones within a radio system. Furthermore, although FIG. 1 depicts the HLRs, VLRs, RPRs, and processing modules as being distinct elements of the zone controllers, in practice, one or more of the HLRs, VLRs, RPRs, and processing modules may be integral with one another. For example, an individual memory element may be utilized for the HLR, VLR and RPR of a zone controller by allocating the address space accordingly. Furthermore, zone controllers 110, 130 may be communicatively coupled via one or more wired or wireless networks (not shown), which may include one or more switches, routers, hubs, access points, intersystem interfaces (e.g., a Project 25 Intersystem Interface), or other networking hardware and/or software, and may provide for a communication path for the zone controllers 110, 130 to exchange information including, for example, permissions information.

Figure 2:
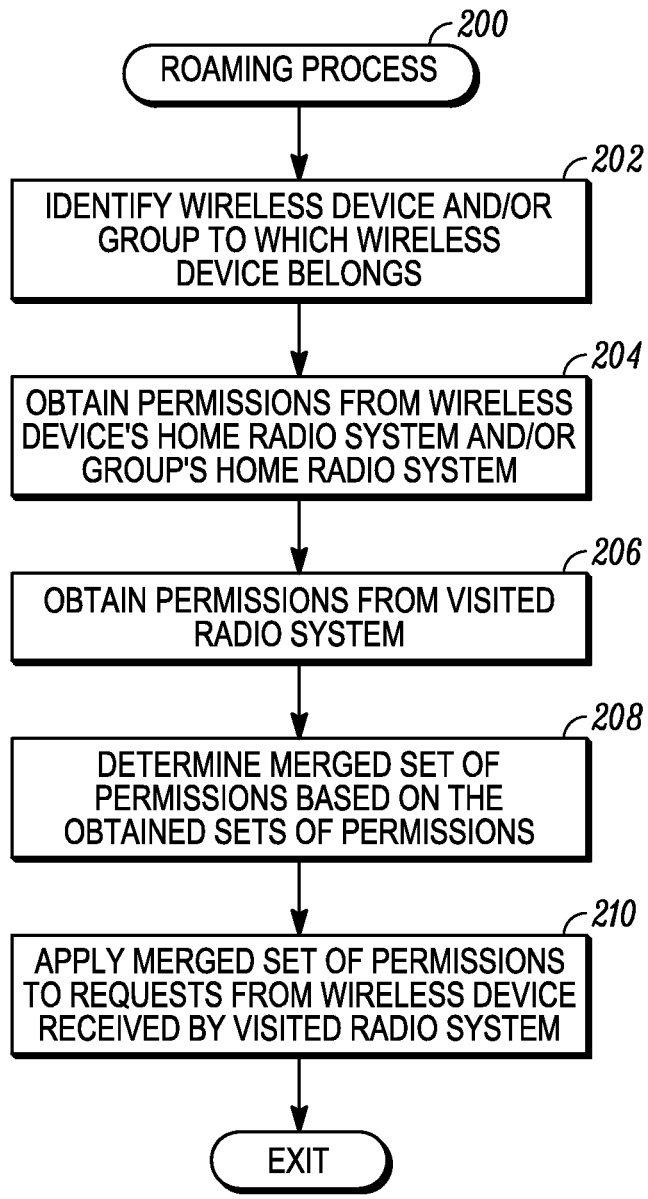
FIG. 2 is a flow diagram of an exemplary roaming process performed by the visited radio system in the communications system of FIG. 1 in accordance with one or more embodiments.

Referring now to FIG. 2, in an exemplary embodiment, a communications system is configured to perform a roaming process 200 and additional tasks, functions, and operations described below. The various tasks may be performed by software, hardware, firmware, or any combination thereof. For illustrative purposes, the following description may refer to elements mentioned above in connection with FIG. 1. In practice, the tasks, functions, and operations may be performed by different elements of the described system, such as the home radio system 102, the visited radio system 104, the roaming device 106, the home zone controller 110, and/or the visited zone controller 130. It should be appreciated that the roaming process 200 may include any number of additional or alternative tasks, the tasks need not be performed in the illustrated order and/or the tasks may be performed concurrently, and/or the roaming process 200 may be incorporated into a more comprehensive procedure or process having additional functionality not described in detail herein. Moreover, one or more of the tasks shown and described in the context of FIG. 2 could be omitted from an embodiment of the respective process as long as the intended overall functionality remains intact.

Referring to FIG. 2, and with continued reference to FIG. 1, in an exemplary embodiment, the roaming process 200 begins with the visited radio system identifying the presence of a wireless device (or group) associated with a different radio system operating within the coverage area of the visited radio system (task 202). For example, the wireless device 106 may broadcast or otherwise transmit a registration request when it is outside of the coverage area of its home radio system 102, wherein the visited radio system 104 and/or visited zone controller 130 receives the registration request from the roaming device 106 via site 132 when the wireless device 106 is within the coverage area of the site 132 associated with the visited zone controller 130. Alternatively, the wireless device 106 may broadcast or otherwise transmit another service request (e.g., an individual call request, a group call request, or the like) in response to user input, wherein the visited radio system 104 and/or visited zone controller 130 receives the registration request from the roaming device 106 via site 132 when the roaming device 106 is within the coverage area of the site 132 associated with the visited zone controller 130. In an exemplary embodiment, the requests broadcast by the wireless device 106 include identifying information for the wireless device 106 that includes identification of the home radio system 102 associated with the roaming device 106. In another example, the wireless device 106 may or may not be associated with the site 132 as its home site, but may be a member of a group that is associated with another site, such as site 112, as its home site. In this way, it can be said that the radio site 132 is a visited radio system as the wireless device 106 is associated with a group that itself is associated with a home radio site different from the site 132.

After identifying a wireless radio device within the coverage area of the visited radio system, the roaming process 200 continues by obtaining a set of permissions associated with one of the wireless device and along with any set(s) of permissions associated with any radio group(s) associated with the roaming radio device from the wireless device's (or group's) home radio system (task 204). In this regard, after identifying the wireless device 106 and its (or its group's) associated home radio system 102, the visited radio system 104 utilizes an intersystem interface (e.g., the Project 25 ISSI) with the home radio system 102 and transmits or otherwise communicates a request for the permissions associated with the roaming device 106 and/or any of its associated radio groups from its home radio system 102 and/or home zone controller 110. In response to the request for permissions, the home radio system 102 and/or home zone controller 110 obtains, from the home radio system's associated HLR 122, the set of permissions associated with the roaming device 106 and/or any set(s) of permissions for any associated radio group(s) and transmits or otherwise communicates the set(s)

of permissions obtained from the HLR 122 to the visited radio system 104 and/or visited zone controller 130. For convenience, but without limitation, any set of permissions obtained from the HLR 122 associated with the roaming device 106 (or group) may alternatively be referred to herein as a home set of permissions.

In an exemplary embodiment, the roaming process 200 also obtains a set of permissions for the wireless device and/or set(s) of permissions for any associated radio group(s) from within the visiting radio system (task 206). In this regard, the zone controller 130 and/or processing module 140 accesses the RPR 146 within the visited radio system 104 and identifies a set of permissions that are associated with or otherwise correspond to the wireless device 106. For example, depending on the embodiment, the administrator or operator of the visited radio system 104 may define a particular set of permissions that are associated with the wireless device 106, a default set of permissions associated with any wireless device from the wireless device's home radio system 102, and/or a global default set of permissions to be associated with any wireless device that is not associated with the visited radio system 104. In this regard, the processing module 140 and/or zone controller 130 identifies and obtains, from the RPR 146, the appropriate set of permissions for the wireless device 106 (or group) within the visited radio system 104. For example, the processing module 140 and/or zone controller 130 may first attempt to obtain a particular set of permissions associated with the wireless device 106 (or group), and if those do not exist, attempt to obtain the default set of permissions associated with the home radio system 102, and lastly, if those do not exist, obtain the global default set of permissions. For convenience, but without limitation, the set of permissions associated with the wireless device 106 (or group) obtained from the RPR 146 in the visited radio system 104 may alternatively be referred to herein as the visited set of permissions. In a similar manner, the administrator or operator of the visited radio system 104 may define sets of permissions for the radio groups associated with the wireless device 106 and/or home radio system 102 in the RPR 146, wherein the processing module 140 and/or zone controller 130 identifies and obtains, from the RPR 146, the appropriate set of permissions for the radio groups associated with the wireless device 106.

After obtaining sets of permissions for the wireless device (and any of its associated radio groups) from the roaming device's home radio system and the visited radio system, the roaming process 200 continues by determining a merged set of permissions for the wireless device (and its associated radio groups) based on the home set of permissions and the visited set of permissions (task 208). For example, in accordance with one or more embodiments, the merged set of permissions contains a plurality of different categories and/or types of permissions, rights, privileges, operating capabilities, and the like, wherein the processing module 140 and/or zone controller 130 obtains criteria and/or values for a first subset of the categories from the visited set of permissions, obtains criteria and/or values for a second subset of the categories (which is mutually exclusive or otherwise different from the first subset) from the home set of permissions, and merges, concatenates, or otherwise combines the pair of obtained criteria to obtain the criteria and/or values for the merged set of permissions. In other embodiments, the processing module 140 and/or zone controller 130 modifies one set of permissions in a manner that is influenced by the other set of permissions to obtain the merged set of permissions. For example, in accordance with one or more embodiments, the processing module 140 and/or zone controller 130 determines the merged set of permissions by effectively substituting a portion of the visited set of permissions for a corresponding portion of the home set of permissions (or vice versa), such that a subset of the merged set of permissions is dictated by the visited set of permissions and the remainder of the merged set of permissions is dictated by the home set of permissions.

In accordance with one or more embodiments, the processing module 140 and/or zone controller 130 may be configured to select the most restrictive criteria and/or values from the obtained sets of permissions to limit the operation of the wireless device 106 within the visited radio system 104. In this regard, for each category of permissions, the processing module 140 and/or zone controller 130 may compare the value or criterion from the home set of permissions with the value or criterion from the visited set of permissions. In response to determining the value or criterion from the home set of permissions is more restrictive than the value or criterion from the visited set of permissions, the processing module 140 and/or zone controller 130 may select the value or criterion from the home set of permissions for use with that category of permissions in the merged set of permissions. Conversely, in response to determining the value or criterion from the visited set of permissions is more restrictive than the value or criterion from the home set of permissions, the processing module 140 and/or zone controller 130 may select the value or criterion from the visited set of permissions for that category of permissions in the merged set of permissions. In this manner, the more restrictive criteria from the visited set of permissions are effectively substituted for those of the home set of permissions (or vice versa) to obtain the merged set of permissions. In an alternative embodiment, the processing module 140 and/or zone controller 130 may be configured to select the least restrictive permissions from the obtained sets of permissions to provide enhanced operation of the wireless device 106 within the visited radio system 104. It should be noted that there are numerous manners in which the home set of permissions and visited set of permissions may be combined, and the subject matter described herein is not intended to be limited to any particular implementation. For example, the administrator of the visited radio system 104 may configure the processing module 140 and/or zone controller 130 to select or otherwise utilize criteria for a specific subset of the permissions from the visited set of permissions and utilize criteria from the home set of permissions for the remaining permissions, thereby allowing the home radio system 102 to always have control of those permissions, rights, privileges, or operating capabilities that the administrator of the visited radio system 104 may not be interested in regulating. Field permissions indicator data (FPID) may be stored at each visited radio system 104 and may identify those permissions that the visited system will control (e.g., those permissions that cannot be overwritten by home radio system permissions) and those fields that can or will be controlled and/or populated via home radio system permissions (e.g., those permissions retrieved from the home radio system 102). The FPID may vary, for example, by time of day, day of week, in response to a security trigger event (such as a detected intrusion), type of visiting radio, identified user of the visiting radio, identified radio group of the visiting radio, or based on some other value or event. The FPID data may be set by the visited radio system administrator, and may be edited locally or remotely by the administrator in the future. In this manner, the home set of permissions may be utilized to automatically augment the visited set of permissions defined by the visited radio system administrator.

In an exemplary embodiment, after determining the merged set of permissions, the roaming process 200 continues by provisioning the visited radio system for operation in accordance with the merged set of permissions and applying the merged set of permissions to any requests received from the roaming radio device (task 210). In this regard, the processing module 140 and/or zone controller 130 stores the merged set of permissions for the wireless device 106 in its VLR 144 and responds to requests (e.g., registration requests, individual call requests, group service requests, or the like) from the wireless device 106 in accordance with the merged set of permissions. In an exemplary embodiment, the zone controller 130 responds to any registration request received from the wireless device 106 by granting and/or denying registration of the wireless device 106 within the visited radio system 104 based on the merged set of permissions. For example, if the visited set of permissions for the wireless device 106 does not allow the wireless device 106 to roam within the visited radio system 104, and the merged set of permissions are determined as the most restrictive criteria of the home set or permissions and the visited set of permissions, then the zone controller 130 will deny the registration request from the wireless device 106, even though the home set of permissions associated with the wireless device 106 allow the wireless device 106 to roam within the visited radio system 104. If the registration of the wireless device 106 is granted, the processing module 140 and/or zone controller 130 handles any subsequent requests from the wireless device 106 in accordance with the merged set of permissions. For example, if the merged set of permissions allows the wireless device 106 to make individual calls but does not allow the wireless device 106 to receive any data services, the processing module 140 and/or zone controller 130 may respond to individual call requests received from the wireless device 106 by processing the call or otherwise allowing the call to go through (with the priority level specified in the merged set of permissions) while responding to any data requests by transmitting or otherwise communicating configuration information to the wireless device 106 that indicates the wireless device 106 is denied data service within the visited radio system 104.

Other types of permissions could be used as well. For example, the visited radio system administrator may determine whether the visited or home set of permissions control whether a wireless device (or group of which a roaming or non-roaming wireless device may be a member) is able to make private calls, make group calls, must use encryption, cannot use encryption, is allowed to connect to certain external networks (e.g., data networks such as the Internet or voice systems such as the Plain Old Telephone System (POTS)), what level of priority to apply for a particular device and/or call group, what QoS level for generated data or voice traffic for the wireless device and/or group, what sub-coverage areas out of a plurality of partially or non-overlapping sub-coverage areas in an umbrella coverage area is allowed to operate, and other values and attributes.

It will be appreciated that in some embodiments, the merged set of permissions limits operation of the wireless device 106 within the visited radio system 104 based on the visited set of permissions. For example, if the visited set of permissions associated with the wireless device 106 does not allow the wireless device 106 to make individual voice calls within the visited radio system 104 and the merged set of permissions are determined as the most restrictive criteria of the home set or permissions and the visited set of permissions, then the zone controller 130 may configure the wireless device 106 and/or the visited radio system 104 to disallow or otherwise deny attempts to establish individual voice calls to/from the wireless device 106 even though the home set of permissions associated with the wireless device 106 would otherwise allow the wireless device 106 to make voice calls within the visited radio system 104. In other embodiments, the visited set of permissions may provide for greater operating capabilities of the wireless device 106 (e.g., if the merged set of permissions are determined as the least restrictive criteria of the home set or permissions and the visited set of permissions, and the visited set of permissions allows voice calls while the home set of permissions does not).

Although the roaming process 200 is focused above in the context of determining merged sets of permissions for individual roaming devices, as alluded to previously, the roaming process 200 may also be utilized for determining merged sets of permissions for home or roaming devices associated with radio groups (or talk groups). In this regard, when a wireless device registers with the radio system 104 (which in this embodiment, may be the wireless device's home radio system or a visited radio system), the radio system 104 identifies the radio group that the wireless device is associated with or otherwise participating in. When the radio group is associated with the home radio system 102, the radio system 104 and/or zone controller 130 obtains, from the home radio system 102 and/or home zone controller 110, the set of permissions associated with the radio group. The radio system 104 and/or zone controller 130 also obtains permissions for the radio group from the RPR 146, and determines a merged set of permissions for the radio group in a similar manner as described above. After determining the merged set of permissions for the radio group, the radio system 104 and/or zone controller 130 responds to requests for the radio group in accordance with the merged set of permissions and applies the merged set of permissions. In this regard, group service requests for the radio group are handled in accordance with the merged permissions for the radio group, rather than the permissions associated with the individual radio devices participating in the radio group. Still referring to FIGS. 1-2, in an exemplary embodiment, the processing module 140 and/or zone controller 130 of the radio system 104 responds to group service requests received from the wireless device 106 (which in this embodiment may be a roaming or a non-roaming device) based on the merged set of permissions for that particular radio group associated with the wireless device 106. For example, the merged set of permissions for the wireless device 106 may provide a relatively low priority level for services provided to the wireless device 106 while the merged set of permissions for one of its associated radio groups (e.g., a group of which wireless device 106 is a member) provides a relatively high priority level for services relating to that associated radio group. In this manner, the radio system 104 handles any group service requests from the wireless device 106 for that radio group with higher priority while handling any other requests from the wireless device 106 (e.g., individual voice call requests or group service requests for other radio groups having a lower priority level) with a lower priority.

In some embodiments, permissions associated with both the wireless device 106 itself and with a group with which the wireless device 106 is associated may be obtained from the home site 112, and may control various permissions and/or services requested by the wireless device 106 at the visited site 132. Various mechanisms may be put into place to determine whether a particular group's permissions control over a particular wireless device's permissions, and vice versa. Such mechanisms may include, for example, storing an indication of priority in each permission entry such that an entry in a device or group permission having a higher priority controls over a same entry in a device or group permission having a lower priority. Additionally or alternatively, any of the above-mentioned methods of determining which permission to apply, including for example least restrictive or most restrictive, may also be used to determine permissions when both individual device permissions and group permission exist. Other possibilities exist as well.

One advantage of the roaming process described above is that intersystem interoperability may be accommodated while allowing the administrator of the visited radio system to control or otherwise dictate the rights and privileges afforded to roaming devices within its coverage area. In this regard, the visited system administrator has better control over the allocation of system resources among other users from other organizations that are roaming within the visited system's coverage area.

For the sake of brevity, conventional techniques related to radio devices and/or radio systems, radio system interoperability, RF communications, data transmission, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms referring to structures do not imply a sequence or order unless clearly indicated by the context. Additionally, the foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with) another element, and not necessarily mechanically. Thus, although the schematic shown in the figures depict one exemplary arrangement of elements, additional intervening elements, devices, features, or components may be present in an embodiment of the depicted subject matter.

While at least one example embodiment has been presented in the foregoing detailed description, it should be appreciated that a vast number of variations exist. It should also be appreciated that the example embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of supporting a wireless communication device operating within a first radio system, the method comprising:
   receiving, at the first radio system, a request from the wireless communication device;
   obtaining a first set of permissions from a home radio system, associated with and as a function of at least one of (i) the wireless communication device when the wireless communication device's home radio system is not the first radio system and (ii) a radio group, of which the wireless communication device is a member, when the radio group's home radio system is not the first radio system;
   obtaining a second set of permissions from the first radio system associated with and as a function of at least one of (i) the wireless communication device and (ii) the radio group of which the wireless communication device is a member;
   obtaining, from the first radio system, field permissions indicator data identifying the permissions in the second set of permissions that can be controlled by the first set of permissions and the permissions in the second set of permissions that cannot be controlled by the first set of permissions;
   merging the first set and the second set of permissions, as a function of the field permissions indicator data, to obtain a merged set of permissions; and
   responding to the request in accordance with the merged set of permissions.

2. The method of claim 1, wherein:
   the radio group is associated with the home radio system;
   the first radio system is different than the radio group's home radio system;
   the first and second sets of permissions are only associated with the radio group.

3. The method of claim 1, wherein the steps of obtaining further comprise:
   obtaining the first set of permissions from the home radio system associated with and as a function of the radio group of which the wireless communication device is a member;
   obtaining the second set of permissions from the first radio system associated with and as a function of the radio group of which the wireless communication device is a member.

4. The method of claim 1, wherein merging the first set and the second set comprises substituting a portion of the second set for a corresponding portion of the first set.

5. The method of claim 1, the merged set of permissions including a plurality of categories, wherein merging the first set and the second set comprises:
   obtaining criteria for a first subset of the plurality of categories from the first set of permissions; and
   obtaining criteria for a second subset of the plurality of categories from the second set of permissions, wherein the first subset and the second subset are different.

6. The method of claim 1, wherein the first set of permissions includes a first criterion for a first category and the second set of permissions includes a second criterion for the first category, and wherein merging the first set and the second set comprises selecting the second criterion for the first category of the merged set of permissions.

7. The method of claim 6, further comprising determining that the second criterion is more restrictive than the first criterion prior to selecting the second criterion, wherein the second criterion is selected in response to determining the second criterion is more restrictive than the first criterion.

8. The method of claim 2, wherein:
   obtaining the first set of permissions comprises obtaining the first set of permissions from a home location register in the home radio system; and
   obtaining the second set of permissions comprises obtaining the second set of permissions from a roaming provisioning register in the first radio system.

9. The method of claim 1, wherein the request is one of a registration request, an individual call request, a group call request, and a data request.

10. The method of claim 1, wherein responding to the request comprises limiting operation of the wireless device within the first radio system based on a criterion obtained from the second set of permissions.

11. The method of claim 2, wherein:
the home radio system comprises a first trunked radio system having a first associated geographic area;
the first radio system comprises a second trunked radio system having a second associated geographic area; and
the second associated geographic area and the first associated geographic area are non-overlapping.

12. The method of claim 1, wherein the field permissions indicator data varies as a function of an identity of the at least one of (i) the wireless communication device and (ii) the radio group.

13. The method of claim 12, wherein the field permissions indicator data further varies, for the at least one of (i) the wireless communication device and (ii) the radio group, as a function of time of day, day of week, detected security event, identified user of the wireless communication device.

14. The method of claim 1, wherein merging the first set and the second set of permissions to obtain a merged set of permissions further comprises merging the first set and the second set of permissions to obtain a merged set of permissions as a function of a preconfigured algorithm applied on a permission field by permission field basis, wherein the algorithm is one selected from most restrictive permission field and least restrictive permission field.

15. A method for supporting operation of a roaming wireless device operating on a visited radio system, the method comprising:
identifying, by the visited radio system, the roaming wireless device within the visited radio system;
obtaining, by the visited radio system, a first set of permissions for the roaming wireless device from a home radio system associated with and as a function of at least one of (i) the roaming wireless device and (ii) a radio group of which the roaming wireless device is a member;
obtaining, by the visited radio system, a second set of permissions for the roaming wireless device from within the visited radio system associated with and as a function of at least one of (i) the roaming wireless device and (ii) the radio group of which the roaming wireless device is a member;
obtaining, by the first radio system, field permissions indicator data identifying the permissions in the second set of permissions that can be controlled by the first set of permissions and the permissions in the second set of permissions that cannot be controlled by the first set of permissions;
determining, by the visited radio system, a merged set of permissions for the roaming wireless device based on the first set of permissions, the second set of permissions, and the field permissions indicator data; and
applying the merged set of permissions to the roaming wireless device.

16. The method of claim 15, the merged set of permissions including a plurality of categories, wherein determining the merged set of permissions comprises:
selecting a subset of the first set of permissions, the subset of the first set of permissions corresponding to a first subset of the plurality of categories;
selecting a subset of the second set of permissions, the subset of the second set of permissions corresponding to a second subset of the plurality of categories that is different from the first subset of the plurality of categories; and
combining the selected subset of the first set of permissions and the selected subset of the second set of permissions to obtain the merged set of permissions.

17. The method of claim 15, wherein:
the first and second sets of permissions are only associated with the radio group;
obtaining the first set of permissions comprises obtaining the first set of permissions from a home location register in the home radio system; and
obtaining the second set of permissions comprises obtaining the second set of permissions from a roaming provisioning register in the visited radio system.

18. The method of claim 15, wherein determining the merged set of permissions comprises:
determining a portion of the second set of permissions is more restrictive than a corresponding portion of the first set of permissions, the portion of the second set of permissions prescribing limited operation for the roaming wireless device within the visited radio system; and
in response to determining the portion of the second set is more restrictive than the corresponding portion of the first set of permissions, substituting the portion of the second set of permissions for the corresponding portion of the first set of permissions to obtain the merged set of permissions; and
applying the merged set of permissions comprises limiting operation of the roaming wireless device within the visited radio system in accordance with the portion of the second set of permissions.

19. The method of claim 15, wherein:
obtaining the first set of permissions comprises obtaining the first set of permissions for the radio group of which the roaming wireless device is a member;
obtaining the second set of permissions comprises obtaining the second set of permissions for the radio group of which the roaming wireless device is a member; and
applying the merged set of permissions to the roaming wireless device comprises:
receiving, by the visited radio system, a group service request for the radio group from the roaming wireless device; and
handling, by the visited radio system, the group service request in accordance with the merged set of permissions.

20. A radio system comprising:
a visitor location register;
a roaming provisioning register including a first set of permissions for one of a wireless device and a radio group operating within the radio system of which the wireless device is a member; and
a processing module coupled to the visitor location register and the roaming provisioning register, wherein the processing module is configured to, responsive to receiving a request from the wireless device:
obtain the first set of permissions from the roaming provisioning register system associated with and as a function of at least one of (i) the wireless device and (ii) the radio group of which the wireless device is a member;
obtain a second set of permissions for the wireless device from a home radio system associated with and as a function of at least one of (i) the wireless device when the wireless device is roaming and (ii) the radio group of which the wireless device is a member;

obtaining field permissions indicator data identifying the permissions in the second set of permissions that can be controlled by the first set of permissions and the permissions in the second set of permissions that cannot be controlled by the first set of permissions;

merge the first set and the second set of permissions, as a function of the field premissions indicator data, to obtain a merged set of permissions for the wireless device; and store the merged set of permissions in the visitor location register.

* * * * *

UNITED STATES PATENT AND TRADEMARK OFFICE
CERTIFICATE OF CORRECTION

| | |
|---|---|
| PATENT NO. | : 8,571,549 B2 |
| APPLICATION NO. | : 13/296375 |
| DATED | : October 29, 2013 |
| INVENTOR(S) | : Larry M. Peterson et al. |

It is certified that error appears in the above-identified patent and that said Letters Patent is hereby corrected as shown below:

IN THE CLAIMS:

In Column 15, Line 1, in Claim 20, delete "obtaining" and insert -- obtain --, therefor.

In Column 15, Line 7, in Claim 20, delete "premissions" and insert -- permissions --, therefor.

Signed and Sealed this
Twentieth Day of December, 2016

Michelle K. Lee
*Director of the United States Patent and Trademark Office*